US008041404B2

(12) United States Patent
Karaoguz et al.

(10) Patent No.: US 8,041,404 B2
(45) Date of Patent: Oct. 18, 2011

(54) MULTIPLE NETWORK WAKE-UP

(75) Inventors: Jeyhan Karaoguz, Irvine, CA (US);
Nambirajan Seshadri, Irvine, CA (US);
James D. Bennett, Hroznetin (CZ)

(73) Assignee: Broadcom Corporation

( * ) Notice: Subject to any disclaimer, the term of this patent is extended or adjusted under 35 U.S.C. 154(b) by 0 days.

(21) Appl. No.: 12/914,192

(22) Filed: Oct. 28, 2010

(65) Prior Publication Data

US 2011/0039607 A1     Feb. 17, 2011

Related U.S. Application Data

(63) Continuation of application No. 11/092,211, filed on Mar. 29, 2005, now Pat. No. 7,826,875.

(60) Provisional application No. 60/601,394, filed on Aug. 13, 2004.

(51) Int. Cl.
    H04M 1/00      (2006.01)
    H04B 1/38      (2006.01)
    H04B 1/10      (2006.01)
(52) U.S. Cl. .................. 455/574; 455/572; 455/303
(58) Field of Classification Search .............. 455/574, 455/572, 303, 521, 522, 127.1, 127.5, 13.4, 455/143, 146, 225
See application file for complete search history.

(56) References Cited

U.S. PATENT DOCUMENTS

| 5,960,344 A | 9/1999 | Mahany |
| 7,231,215 B2 | 6/2007 | Lewis et al. |
| 7,826,875 B2 * | 11/2010 | Karaoguz et al. ............. 455/574 |
| 2006/0035682 A1 | 2/2006 | Karaoguz et al. |
| 2006/0205444 A1 | 9/2006 | Aerrabotu et al. |

* cited by examiner

*Primary Examiner* — Eugene Yun
(74) *Attorney, Agent, or Firm* — McAndrews, Held & Malloy, Ltd.

(57) ABSTRACT

A system and method for managing messaging in a mobile communication system (e.g., having power-save capability) in a multiple network environment. For example, the mobile communication system may operate in a power-save mode (e.g., a mode in which the mobile communication system does not communicate messages). The mobile communication system may exit the power-save mode. After exiting from the power-save mode, the mobile communication system may determine to establish communication with a second system (e.g., a message server) over a second communication path instead of a first communication path. Communication with the second system may be established over the second communication path, and message-related information may be communicated between the mobile communication system and the second system. Such message-related information may, for example, comprise message information, information regarding message availability, or information regarding the communication of message information.

18 Claims, 4 Drawing Sheets

MULTIPLE NETWORK WAKE-UP

CROSS-REFERENCE TO RELATED APPLICATIONS/INCORPORATION BY REFERENCE

This patent application is a continuation of U.S. patent application Ser. No. 11/092,211, filed Mar. 29, 2005, issuing as U.S. Pat. No. 7,826,875 on Nov. 2, 2010; which claims benefit from and priority to provisional patent application Ser. No. 60/601,394, filed Aug. 13, 2004, and titled "MULTIPLE NETWORK WAKE-UP," the contents of which are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Mobile (or portable) communication systems may, in various scenarios, operating in a power-save mode. A power-save mode may be generally viewed as an operating mode that is designed to conserve electrical energy that is consumed by a mobile communication system. A power-save mode may, for example, comprise operating a mobile communication system with reduced or no message communication capability. Such a mobile communication system may then, occasionally, transition out of the power-save mode to check for messages.

Various communication paths utilized to communicate information (e.g., message information) may be characterized by any of a variety of communication path characteristics. Without limitation, such communication path characteristics may comprise communication quality, data rate, reliability, energy-efficiency, etc.

Mobile communication systems may comprise any of a variety of performance goals or constraints. Without limitation, such performance goals or constraints may comprise a relatively finite supply of electrical energy (e.g., from a battery source), a communication quality requirement, a communication security requirement, etc.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for managing messaging in a mobile communication system (e.g., having power-save capability) in a multiple network environment, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
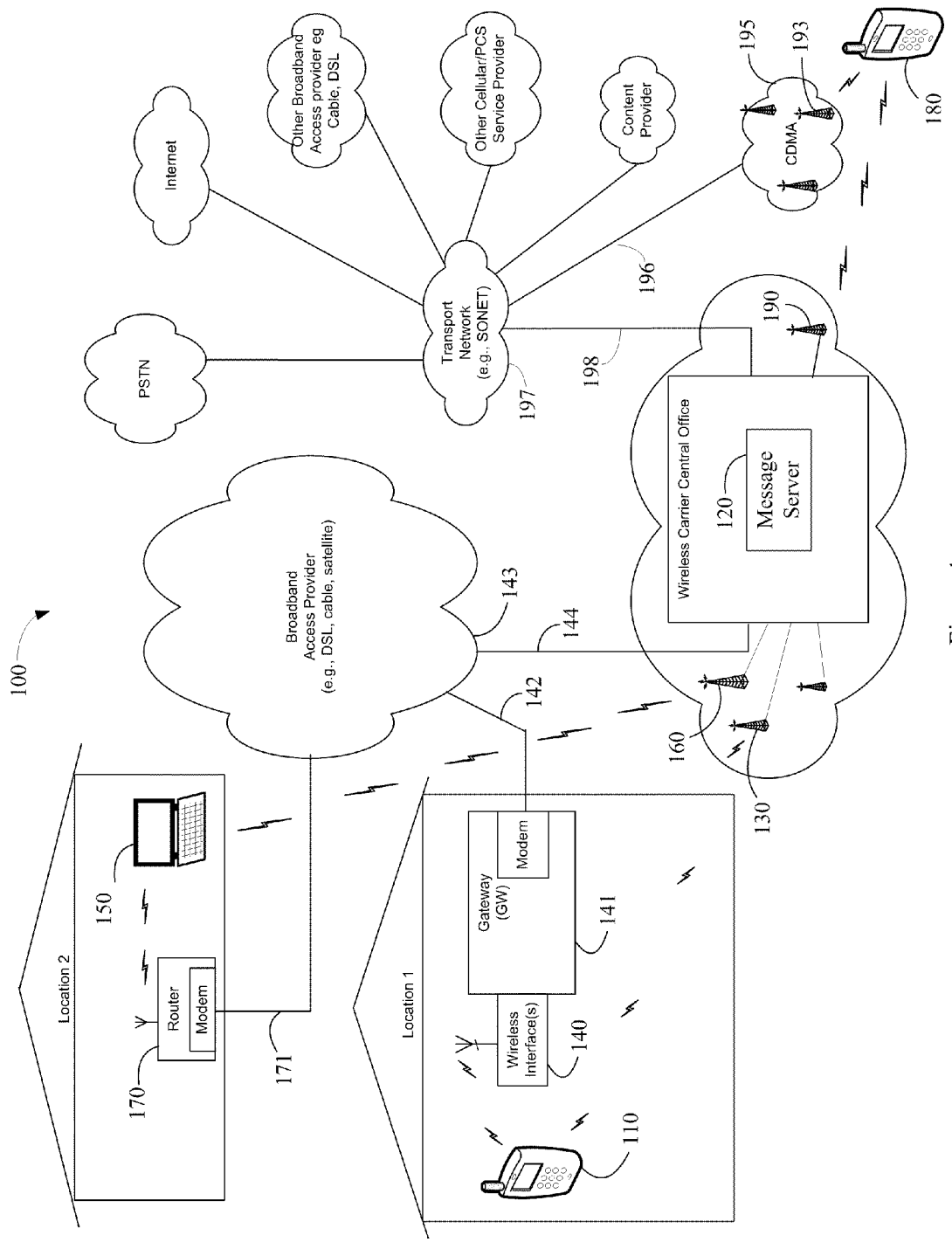
FIG. 1 shows a diagram of an exemplary multiple network communication environment, in accordance with various aspects of the present invention.

FIG. 1 shows a diagram of an exemplary multiple network communication environment 100, in accordance with various aspects of the present invention. The exemplary communication environment 100 may be referred to in the following discussion to provide exemplary illustrations of various aspects of the present invention. By no means, is the scope of various aspects of the present invention to be limited by characteristics of the exemplary communication environment 100.

The exemplary communication environment 100 comprises a first mobile communication system 110. Though the first mobile communication system 110 is generally illustrated as a handheld mobile communication device, the first mobile communication system 110 may comprise characteristics of any of a variety of mobile communication systems. For example and without limitation, the first mobile communication system 110 may comprise characteristics of a cellular phone, paging device, mobile multi-media communication device, pocket computer, personal digital assistant, mobile telephone, mobile or portable computer, etc. Accordingly, the scope of various aspects of the present invention should not be limited by characteristics of a particular mobile communication system.

The exemplary communication environment 100 may comprise a message server 120 that, for example, stores and maintains messages for mobile communication systems that are powered down or operating in a power-save mode (e.g., a sleep state). Such messages may comprise any of a variety of communication media (e.g., multi-media, audio, video, text, graphics, pictures, etc.). The message server 120 may, for example, be a single unit or may comprise a plurality of geographically co-located or distributed components. The exemplary message server 120 is illustrated at a wireless carrier central office. However, this location is merely illustrative and should in no way limit the scope of various aspects of the present invention.

The first mobile communication system 110 may comprise the capability to communicate information over a plurality of communication paths. A communication path may generally be defined as a route that information (or data) travels between one communication system and one or more other communication systems. A communication path may comprise any of a variety of communication path characteristics. For example and without limitation, a communication path may comprise a direct link between communication systems or may comprise one or more intervening communication networks between communication systems.

For example, a first communication path of the plurality of communication paths may comprise a first communication network, and a second communication path of the plurality of information communication paths may comprise a second communication network in place of at least a portion of the first communication network. In a non-limiting exemplary scenario, a first communication path of the plurality of information communication paths may comprise a telecommunication network, and a second communication path of the plurality of information communication paths may comprise a computer communication network in place of at least a portion of the telecommunication network. In the non-limiting exemplary scenario, the first communication path may comprise utilizing a telecommunication network to provide the entire communication path between first and second communication systems, and the second communication path may utilize a computer network to communicate between the first communication system and a central switch of the telecommunication network and utilize the telecommunication network to communicate information between the central switch and the second communication system. The scope of various aspects of the present invention should not be limited by characteristics of any particular path through which information may flow between systems.

In the exemplary communication environment 100, the first mobile communication system 110 is communicatively coupled to the message server 120 through two communication paths. The first communication path comprises a wireless interface 130 (e.g., a base transceiver subsystem) between the first mobile communication system 110 and the message server 120 at the wireless carrier central office. The second communication path comprises a local wireless interface 140 between the first mobile communication system 110 and a gateway 141. The local wireless interface 140 and gateway 141 may, for example and without limitation, be part of a local communication system (e.g., a local telecommunication system or local area computer network) such as might be found at a workplace.

The gateway 141 may comprise a modem and be communicatively coupled through communication link 142 to a broadband communication network 143. The broadband communication network 143 may, for example and without limitation, comprise characteristics of a cable, DSL or satellite broadband access provider. The broadband communication network 143 may be coupled through communication link 144 to the message server 120 at the wireless carrier central office.

Communication links 142 and 144 (and other communication links of the exemplary communication environment 100) may comprise characteristics of any of a variety of communication link types. For example and without limitation, communication links 142 and 144 may comprise any of a variety of communication media (e.g., wired, wireless, tethered optical, non-tethered optical, etc.). Also for example, communication links 142 and 144 may be based any of a variety of communication standards or protocols. The scope of various aspects of the present invention should not be limited by characteristics of any particular communication link type.

The first mobile communication system 110 may communicate message information with the message server 120 over either of the described first or second communication paths. Note that though the exemplary first mobile communication system 110 is illustrated as communicating over two different communication paths and associated networks, the first mobile communication system 110 may also comprise the capability to communicate over more than two different communication paths and associated networks.

The exemplary communication environment 100 also comprises a second mobile communication system 150 (e.g., a mobile or portable e-mail device, pocket computer or laptop with multi-network communication capability) that comprises the capability to communicate information over a plurality of communication paths.

In the exemplary communication environment 100, the second mobile communication system 150 is communicatively coupled to the message server 120 through two communication paths. The first communication path comprises a wireless interface 160 (e.g., a base transceiver subsystem) between the second mobile communication system 150 and the message server 120 at the wireless carrier central office. The second communication path comprises a local wireless interface 170 (e.g., comprising a wireless router and modem). The local wireless interface 170 may, for example and without limitation, be part of a home or personal communication system (e.g., a home-centric telecommunication system or personal area computer network) such as might be found in the home.

The local wireless interface 170 may comprise a modem and may be communicatively coupled through communication link 171 to the broadband communication network 143 discussed previously. The broadband communication network 143 may, in turn, be communicatively coupled through communication link 144 to the message server 120 at the wireless carrier central office. As with communication links 142 and 144 discussed previously, communication link 171 may comprise characteristics of any of a variety of communication link types.

The second mobile communication system 150 may communicate message information with the message server 120 over either of the described first or second communication paths. Note that though the exemplary second mobile communication system 150 is illustrated as communicating over two different communication paths and associated networks, the second mobile communication system 150 may also comprise the capability to communicate over more than two different communication paths and associated networks.

The exemplary communication environment 100 also comprises a third mobile communication system 180 (e.g., a cellular phone) that comprises the capability to communicate information over a plurality of communication paths.

In the exemplary communication environment 100, the third mobile communication system 180 is communicatively coupled to the message server 120 through two communication paths. The first communication path comprises a wireless interface 190 (e.g., a base transceiver subsystem) between the third mobile communication system 180 and the message server 120 at the wireless carrier central office. The second communication path comprises a wireless interface 193 of a CDMA network 195, which is in turn, communicatively coupled to a transport network 197 through communication link 196. The transport network 197 may then, for example, be communicatively coupled to the message server 120 through communication link 198. As with communication links 142, 144 and 171 discussed previously, communication links 196 and 198 may comprise characteristics of any of a variety of communication link types.

The third mobile communication system 180 may communicate message information with the message server 120 over either of the described first or second communication paths.

Note that though the exemplary third mobile communication system 180 is illustrated as communicating over two different communication paths and associated networks, the third mobile communication system 180 may also comprise the capability to communicate over more than two different communication paths and associated networks.

At this point, it is again stressed that the exemplary communication environment 100 is merely exemplary and will be referred to in the following discussion to provide specific examples of generally broader aspects of the present invention. Accordingly, the scope of various aspects of the present invention should not be limited by characteristics of the exemplary communication environment 100.

Figure 2:
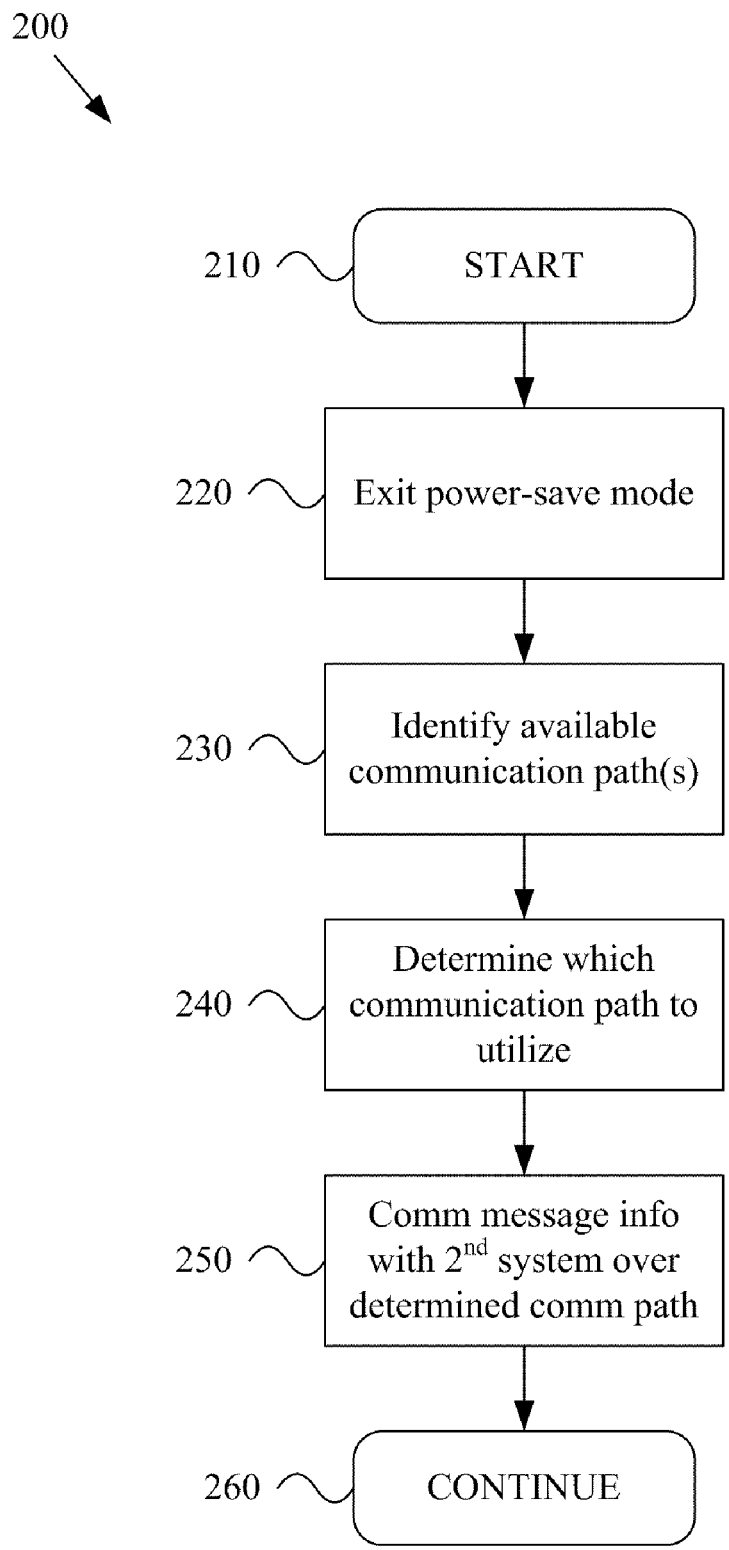
FIG. 2 shows a flow diagram of an exemplary method, in a mobile communication system, for retrieving messages from a second system, in accordance with various aspects of the present invention.

FIG. 2 shows a flow diagram of an exemplary method 200, in a mobile communication system, for retrieving messages from a second system, in accordance with various aspects of the present invention. As explained previously, a mobile communication system may comprise characteristics of any of a variety of mobile communication systems. For example and without limitation, the first mobile communication system may comprise characteristics of a cellular phone, paging device, mobile multi-media communication device, pocket computer, personal digital assistant, mobile telephone, mobile or portable computer, etc. Accordingly, the scope of various aspects of the present invention should not be limited by characteristics of a particular mobile communication system.

The exemplary method 200 may begin at step 210. The exemplary method 200, and all methods discussed herein, may begin for any of a variety of reasons. For example and without limitation, the method 200 may begin executing when a mobile communication system that is implementing the method 200 enters or operates in a power-save mode. Also for example, the method 200 may begin upon expiration of a timer (e.g., a periodic timer that wakes a sleeping mobile communication system). Further for example, the method 200 may begin upon a user command (e.g., an explicit command that causes the mobile communication system to exit power-save mode). Still further for example, the method 200 may begin upon power-up or reset of the mobile communication system. Accordingly, the scope of various aspects of the present invention should not be limited by characteristics of any particular initiating event or condition.

The exemplary method 200 may, at step 220, comprise exiting from a power-save mode of operation. A power-save mode of operation may be viewed generally as a mode of operation for the mobile communication system in which the mobile communication system is operating with reduced performance and/or functionality to save electrical energy. A power-save mode of operation may, for example, comprise powering down message communicating circuitry (e.g., transceiver circuitry and related signal processing circuitry). In such a mode, the mobile communication system might not be capable of receiving messages from another system (e.g., a message server). A mobile communication system may, for example, periodically exit from the power-save mode to check for messages that another system (e.g., a message server) is waiting to deliver to the mobile communication system.

Such a message may comprise characteristics of any of a variety of message types. For example and without limitation, a message may comprise a multi-media, video or audio message. A message may, for example, comprise a textual, graphical or pictorial message. The scope of various aspects of the present invention should not be limited by characteristics of a particular type of message.

Step 220 may comprise exiting from the power-save mode for various durations of time. For example, step 220 may comprise exiting from the power-save mode just long enough to determine whether there are pending messages to be delivered to the mobile communication system and then re-entering the power-save mode. Also for example, step 220 may comprise exiting from the power-save mode for a relatively longer period of time (e.g., to perform functions not directly related to the communication of pending messages). For example, step 220 may comprise exiting from the power-save mode to make a phone call, listen to music, compose a message, view a video, etc. Accordingly, the scope of various aspects of the present invention should not be limited by characteristics of any particular reason for exiting power-save mode or of a particular duration for which the mobile communication system exits the power-save mode.

After exiting from the power-save mode at step 220, the exemplary method 200 may, at step 230, comprise determining the availability of (or identifying) one or more communication paths over which information related to pending messages may be communicated. In a non-limiting exemplary scenario, a plurality of communication paths may be available to communicate message information between the mobile communication system and a message server. In another non-limiting exemplary scenario, a plurality of communication paths may be available to communicate message information between the mobile communication system and a plurality of message servers. Such a plurality of message servers may, for example, be independent or related (e.g., mirrored).

As discussed previously, a communication path between communicating systems may pass through one or more communication networks. For example and without limitation, a first communication path may communicatively couple systems through a first network, and a second communication path may communicatively couple systems through a second network that is independent of the first network. Also for example, a first communication path may communicatively couple systems through a first network, and a second communication path may communicatively couple systems through a second network and a third network. Further for example, a first communication path may communicatively couple systems through a first network, and a second communication path may communicatively couple systems through a second network and at least a portion of the first network. In other words, different communication paths may comprise common components.

In a non-limiting exemplary scenario, a first communication path may communicatively couple systems through a telecommunication network, and a second communication path may communicatively couple systems through a computer network (e.g., the Internet, a Metropolitan Area Network, Wide Area Network, Local Area Network, Personal Area Network, etc.). In another non-limiting exemplary scenario, a first communication path may communicatively couple systems through a satellite communication network, and a second communication path may communicatively couple systems through a Personal Area Network ("PAN"), the Public Switched Telephone Network ("PSTN") and a SONET transport network. In yet another non-limiting exemplary scenario, a first communication path may communicatively couple systems through a cellular telecommunication network, and a second communication path may communicatively couple systems through a PAN and the cellular telecommunication network.

Referring momentarily to the exemplary communication environment 100 illustrated in FIG. 1, the first mobile communication system 110 may be communicatively coupled to the message server 120 over a first communication path that comprises a wireless interface 130 coupled to the message server 120 through the wireless carrier's communication infrastructure. The first mobile communication system 110 may also be communicatively coupled to the message server 120 over a second communication path that comprises a local wireless interface 140, local gateway 141, and broadband communication network 143 communicatively coupled to the message server 120. As yet another example, the second mobile communication system 150 may be communicatively coupled to the message server 120 through a first communication path that comprises an wireless interface 160 coupled to the message server 120 through the wireless carrier's communication infrastructure. The second mobile communication system 150 may also be communicatively coupled to the message server 120 through a second communication path that comprises a local wireless interface 170 and broadband communication network 143 communicatively coupled to the message server 120.

As illustrated previously by way of example, various communication paths may comprise any of a variety of communication path characteristics. Accordingly, the scope of various aspects of the present invention should not be limited by characteristics of any particular communication path or by characteristics of one or more communication networks that a communication path may traverse.

Step 230 may comprise determining the availability of one or more communication paths in any of a variety of manners. For example and without limitation, step 230 may comprise listening for and receiving one or more beacon signals transmitted from respective access points of the one or more communication paths. In a non-limiting exemplary scenario, where a communication path comprises a cellular telecommunication network, step 230 may comprise monitoring the air medium for a beacon signal associated with the cellular telecommunication network. In another non-limiting exemplary scenario, where a communication path comprises a relatively local or personal wireless network based on the IEEE 802.11 communication standard, step 230 may comprise monitoring the air medium for an 802.11 beacon signal, which an access point may transmit periodically (e.g., every 100 ms).

Step 230 may also, for example, comprise transmitting one or more beacon signals that may be received by an access point of the one or more communication paths. Such access point, or another communicatively coupled system, may respond to the beacon signal with a response message. Step 230 may then receive such a response message, which may be indicative of the availability of the access point and associated communication network or path.

Step 230 may also, for example, comprise listening for non-beacon network traffic to determine the availability of a communication network or path. Step 230 may further, for example, comprise communicating information with a network status database to ascertain the availability of a network or set of networks. In general, step 230 may comprise determining the availability of (or identifying) one or more communication paths (or associated networks) in any of a variety of manners. Accordingly, the scope of various aspects of the present invention should not be limited by characteristics of a particular manner of determining the availability of one or more communication paths.

The exemplary method 200 may, at step 240, comprise determining which of a plurality of available communication paths to utilize to communicate with a second system (e.g., a message server). Step 240 may comprise determining which of a plurality of communication paths to utilize in any of a variety of manners, examples of which will be discussed below.

For example and without limitation, step 240 may comprise sequencing through an ordered list of communication paths (or associated networks) to determine (or select) a communication path. For example, the mobile communication system may include (e.g., stored in an on-board memory device) or have access to a prioritized list of communication paths to utilize. The communication paths (and associated systems) at the top of the list may be preferred to the communication paths at the bottom of the list. Referring briefly to the exemplary communication environment 100 illustrated in FIG. 1, for the second mobile communication system 150, the second communication path (e.g., including wireless interface 170 and the broadband communication network 143) may be higher on the ordered list than the first communication path (e.g., including wireless access point 160 and the wireless carrier communication infrastructure).

In an exemplary scenario where step 240 comprises utilizing an ordered list of communication paths to determine a communication path, such an ordered list may be formed in any of a variety of manners. For example, such an ordered list may be directly specified by user input. Alternatively for example, such an ordered list may be formed by the mobile communication system based on any of a number of criteria. For example, such an ordered list may be based, at least in part, on energy consumption (e.g., with the most energy-efficient communication paths at the top of the list). Also for example, such an ordered list may be based, at least in part, on communication quality (e.g., data rate, noise, error rate, communication reliability, etc.). Further for example, such an ordered list may be based, at least in part, on monetary cost. In general, such an ordered list may be formed in any of a variety of manners. Accordingly, the scope of various aspects of the present invention should not be limited by characteristics of any particular manner of forming such an ordered list.

Step 240 may also, for example, comprise determining (or selecting) the communication path in real-time, based on any of a variety of conditions. For example and without limitation, step 240 may comprise determining a communication path based on current energy conditions, current communication environment, current communication cost, current communication demands, etc. In a non-limiting exemplary scenario, step 240 may comprise determining that while a first communication path may be currently preferable for communication quality reasons, current energy requirements (e.g., current energy supply or demand) mandate that a second communication path be selected. In another non-limiting exemplary scenario, step 240 may comprise determining that while a first communication path may be currently preferable for energy demand reasons, minimum acceptable quality dictates that a second communication path be selected.

Referring to the communication environment 100 of FIG. 1, in a non-limiting exemplary scenario, step 240 may comprise the first mobile communication system 110 determining that, because of energy concerns, communicating with the message server 120 through the second communication path (e.g., through local wireless interface 140, gateway 141 and broadband communication network 143) is preferable to communicating with the message server 120 through the first communication path (e.g., through wireless access point 130 and the wireless carrier communication infrastructure). In another non-limiting exemplary scenario, step 240 may comprise the second mobile communication system 150 determining, because of a prioritized list, to communicate with the message server 120 through the second communication path (e.g., through local wireless interface 170 and the broadband communication network 143) instead of through the first communication path (e.g., through wireless access point 160 and the wireless carrier communication infrastructure).

As discussed previously, step 230 may have identified available communication paths, and step 240 may have determined which of the identified communication paths to utilize. Steps 230 and 240 are not necessarily separate and thus may interact with each other. For example and without limitation, step 240 may comprise determining a first preferred communication path, and step 230 may then comprise determining the availability of the first preferred communication path. Then for example, if the first preferred communication path is not currently available, step 240 may comprise determining a second preferred communication path, and step 230 may then comprise determining the availability of the second preferred communication path, and so on. Generally, steps of the exemplary method 200 have been discussed separately and in a particular order to enhance fundamental understanding. Such structured discussion should, by no means, limit the scope of various aspects of the present invention.

In general, step 240 may comprise determining which of a plurality of available communication paths to utilize to communicate with a second system (e.g., a message server). Accordingly, the scope of various aspects of the present invention should not be limited by any particular manner of making such determination.

The exemplary method 200 may, at step 250, comprise communicating message information with another system over a determined communication path (e.g., as determined at step 240). Such message information may, for example, comprise one or more messages, information related to the availability of one or more messages, information related to the communication of one or more messages, etc. For example and without limitation, step 250 may comprise establishing communication with a second system over the determined communication path and retrieving messages from (or delivering messages to) the second system over the determined communication path.

Step 250 may comprise communicating such message information over the determined communication path in any of a variety of manners. Step 250 may, for example, comprise utilizing any of a variety of communication protocols. Also for example, step 250 may comprise utilizing any of a variety of encoding, compression or encryption techniques. Further for example, step 250 may comprise utilizing any of a variety of secure access mechanisms. Accordingly, the scope of various aspects of the present invention should not be limited by characteristics of a particular manner of communicating message information over a communication path.

The method 200 may, at step 260, comprise performing continued processing. Such continued processing may comprise performing any of a large variety of continued processing. For example and without limitation, step 260 may comprise returning the mobile communication system to the power-save mode. Also for example, step 260 may comprise repeating the communication path selection and message communication steps with another communication system. Further for example, step 260 may comprise operating the mobile communication system in a standard mode of operation. Accordingly, the scope of various aspects of the present invention should not be limited by characteristics of any particular continued processing activities.

The exemplary method 200 illustrated in FIG. 2 and discussed above was presented to provide specific examples of generally broader aspects of the present invention. Accordingly, the scope of various aspects of the present invention should not be limited by specific characteristics of the exemplary illustration.

Figure 3:
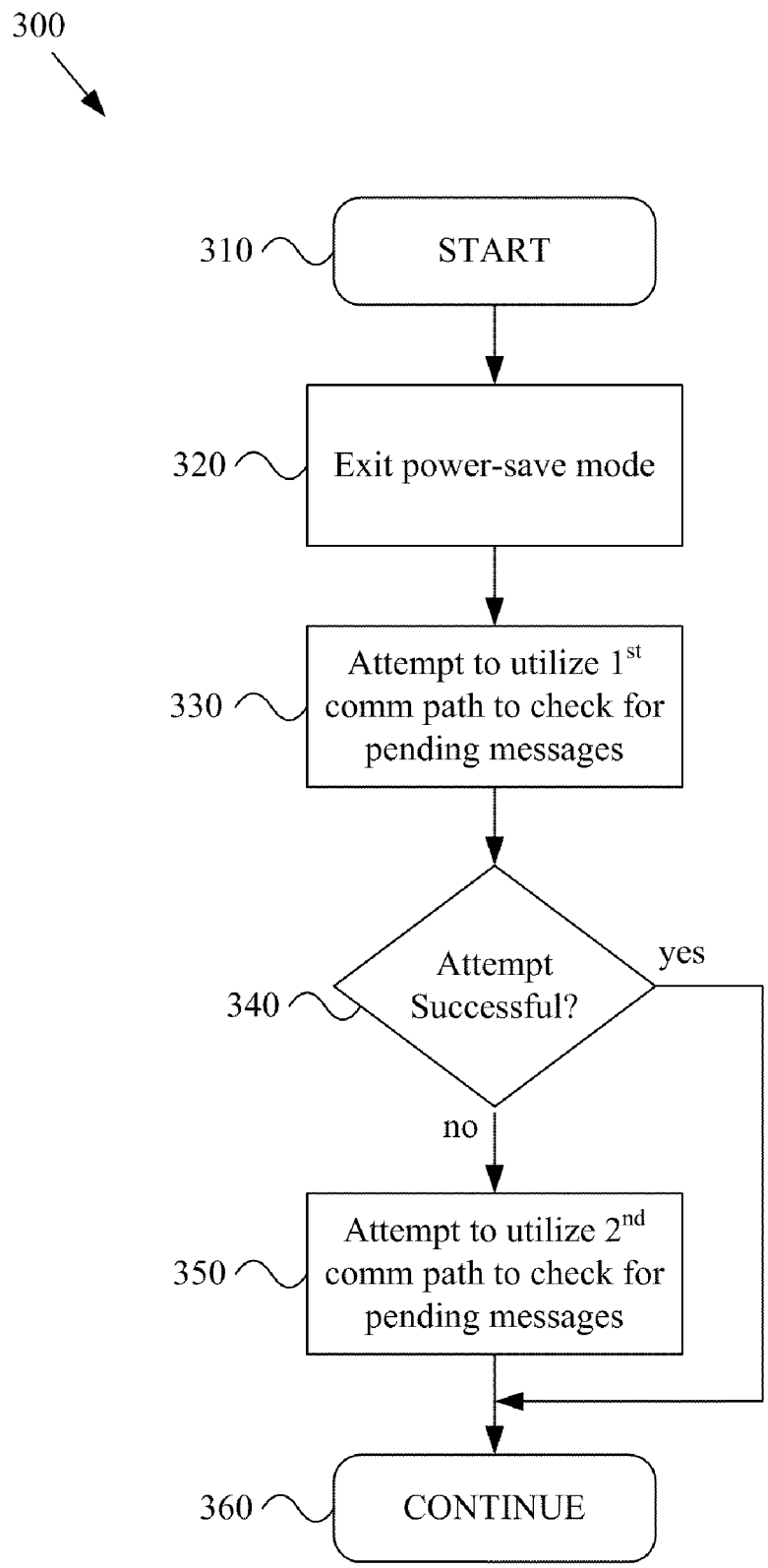
FIG. 3 shows a flow diagram of an exemplary method, in a mobile communication system, for determining the existence of pending messages, in accordance with various aspects of the present invention.

FIG. 3 shows a flow diagram of an exemplary method 300, in a mobile communication system, for determining the existence of pending messages, in accordance with various aspects of the present invention. The exemplary method 300 may, for example and without limitation, share various characteristics with the exemplary method 200 illustrated in FIG. 2 and discussed previously.

Various aspects of the exemplary method 300 may, in the following discussion, be illustrated by reference to the exemplary communication environment 100 illustrated in FIG. 1. It should be noted that the scope of various aspects of the present invention should not be limited by characteristics of such exemplary illustrations.

The exemplary method 300 may, at step 320, comprise the mobile communication system exiting power-save mode. Step 320 may, for example and without limitation, share various characteristics with step 220 of the exemplary method 200 discussed previously.

The exemplary method 300 may, at step 330, comprise attempting to utilize (e.g., communicate over) a first communication path to check for pending messages. Various characteristics of communication paths were discussed previously.

Step 330 may, for example and without limitation, comprise determining which of a plurality of communication paths (e.g., a first selected communication path) to utilize. As discussed previously with regard to step 240 of the exemplary method 200 illustrated in FIG. 2, such determining may comprise analyzing an ordered list of communication paths to utilize or may, for example, comprise performing real-time analysis of currently available communication paths to determine which communication path to utilize. Such determination may, for example, be based on various communication path characteristics (e.g., energy utilization, predetermined priority, user input, expected communication quality, current communication environmental conditions, etc.).

In attempting to communicate over the first selected communication path, step 330 may, for example, comprise determining the availability of the first selected communication path. As discussed previously with regard to step 230 of the exemplary method 200 illustrated in FIG. 2, determining the availability may comprise any of a variety of techniques for determining communication network and/or communication path availability. For example and without limitation, step 330 may comprise communicating beacon signal information with an access point of a communication network of the first selected communication path. Further for example, step 330 may comprise communicating a test message to various nodes of the first selected communication path or to the system(s) with which the mobile communication system desires to communicate.

Step 330 may, for example, comprise establishing a communication link between the mobile communication system and a second system over the first selected communication path. Such a second system (e.g., a message server) may, for example, comprise information related to messages awaiting delivery to the mobile communication system. Such information may, for example, comprise the message information or information indicating the presence or absence of pending messages. Such a second system may also, for example, receive message information from the mobile communication system.

Step 330 may, after establishing a communication link between the mobile communication system and a second system over the first selected communication path, comprise communicating message-related information with the second system. Step 330 may, for example and without limitation, share various characteristics with step 250 of the exemplary method 200 illustrated in FIG. 2 and discussed previously. As mentioned previously, the message-related information may, for example and without limitation, comprise actual message information, information related to the presence or absence of pending messages, or information related to the location or communication of pending messages.

Referring briefly to the exemplary communication environment 100 illustrated in FIG. 1, step 330 may comprise the first mobile communication system 110 attempting to communicate with the message server 120 over a first selected communication path (e.g., through the local wireless interface 140, gateway 141 and broadband communication network 143) to determine whether the message server 120 (or some other message source) has pending messages for the first mobile communication system 110. In another non-limiting exemplary scenario, step 330 may comprise the third mobile communication system 180 attempting to communicate with the message server 120 over a first communication path (e.g., through wireless interface 193, the CDMA network 195 and the SONET transport network 197) to determine whether the message server 120 (or some other message source) has pending messages for the third mobile communication system 180.

The method 300 may, at step 340, comprise determining whether the step 330 attempt to check for pending messages was successful. For example and without limitation, step 340 may comprise determining whether step 330 yielded an acceptable exchange of message-related information. Note that this is not necessarily related to whether or not step 330 determines that pending messages exist. For example, in an exemplary scenario, if step 330 completes a successful exchange of information with a message server and finds that no pending messages exist, then step 340 may determine that step 330 was successful.

If, for example, step 340 determines that the step 330 attempt to check for pending messages was successful, then step 340 may direct execution flow of the method 300 to step 360 for continued processing. If, for example, step 340 determines that the step 330 attempt to check for pending messages was not successful, then step 340 may direct execution flow of the method 300 to step 350.

Step 360 may comprise performing continued processing. Step 360 may, for example and without limitation, share various characteristics with step 260 of the exemplary method 200 illustrated in FIG. 2 and discussed previously. For example, step 360 may comprise the mobile communication system exchanging message information with one or more other systems. Also for example, step 360 may comprise transitioning the mobile communication system back into a power-save mode.

Step 350 may comprise attempting to utilize (e.g., communicate over) a second communication path to check for pending messages. Various aspects of communication paths were discussed previously. For example, a second communication path may be completely independent of the first communication path (e.g., as utilized at step 330) or may comprise at least a portion of the first communication path.

Step 350 may, for example and without limitation, comprise determining which of a plurality of communication paths (e.g., a second selected communication path) to utilize. As discussed previously with regard to exemplary step 330 and step 240 of the exemplary method 200 illustrated in FIG. 2, such determining may comprise analyzing an ordered (or prioritized) list of communication paths to utilize or may, for example, comprise performing real-time analysis of currently available communication paths to determine which communication path to utilize. Such determination may, for example, be based on various communication path characteristics (e.g., energy utilization, predetermined priority, user input, expected communication quality, current communication environmental conditions, etc.).

In a non-limiting exemplary scenario, step 330 may have determined that the first selected communication path was preferable to the second selected communication path to utilize to check for pending messages. For example, step 330 may have determined that the first selected communication path was preferable because the first selected communication path was at or near the top of an ordered list of communication paths. Also for example, step 330 may have determined that the first selected communication path was preferable because of relatively high energy efficiency or communication quality. Similarly, in the non-limiting exemplary scenario, step 350 may determine that the second selected communication path is preferable to other communication paths for similar reasons.

In attempting to communicate over the second selected communication path, step 350 may, for example, comprise determining the availability of the second selected communication path. As discussed previously with regard to step 330 and step 230 of the exemplary method 200 illustrated in FIG. 2, determining the availability may comprise any of a variety of techniques for determining communication network and/or communication path availability. For example and without limitation, 330 may comprise communicating beacon signal information with an access point of a communication network of the second selected communication path. Further for example, step 350 may comprise communicating a test message to various nodes of the second selected communication path or to the system(s) with which the mobile communication system desires to communicate.

Step 350 may, for example, comprise establishing a communication link between the mobile communication system and a second system over the second selected communication path. Such a second system (e.g., a message server) may, for example, comprise information related to messages awaiting delivery to the mobile communication system. The second system may, for example and without limitation, be the same second system with which the mobile communication system attempted to communicate at step 330. Such information may, for example, comprise the message information or information indicating the presence or absence of pending messages. Such a second system may also, for example, receive message information from the mobile communication system.

Step 350 may, after establishing a communication link between the mobile communication system and a second system over the second selected communication path, comprise communicating message-related information with the second system. Step 350 may, for example and without limitation, share various characteristics with step 330 or step 250 of the exemplary method 200 illustrated in FIG. 2 and discussed previously. As mentioned previously, the message-related information may, for example and without limitation, comprise actual message information, information related to the presence or absence of pending messages, or information related to the location or communication of pending messages.

Referring briefly to the exemplary communication environment 100 illustrated in FIG. 1, step 350 may comprise the first mobile communication system 110 attempting to communicate with the message server 120 over a second selected communication path (e.g., through wireless access point 130 and the communication infrastructure of the wireless carrier) to determine whether the message server 120 (or some other message source) has pending messages for the first mobile communication system 110. In another non-limiting exemplary scenario, step 350 may comprise the third mobile communication system 180 attempting to communicate with the message server 120 over a second selected communication path (e.g., through wireless access point 190 and the communication infrastructure of the wireless carrier) to determine whether the message server 120 (or some other message source) has pending messages for the third mobile communication system 180.

The exemplary method 300 illustrated in FIG. 3 and discussed above was presented to provide specific examples of generally broader aspects of the present invention. Accordingly, the scope of various aspects of the present invention should not be limited by specific characteristics of the exemplary illustration.

Figure 4:
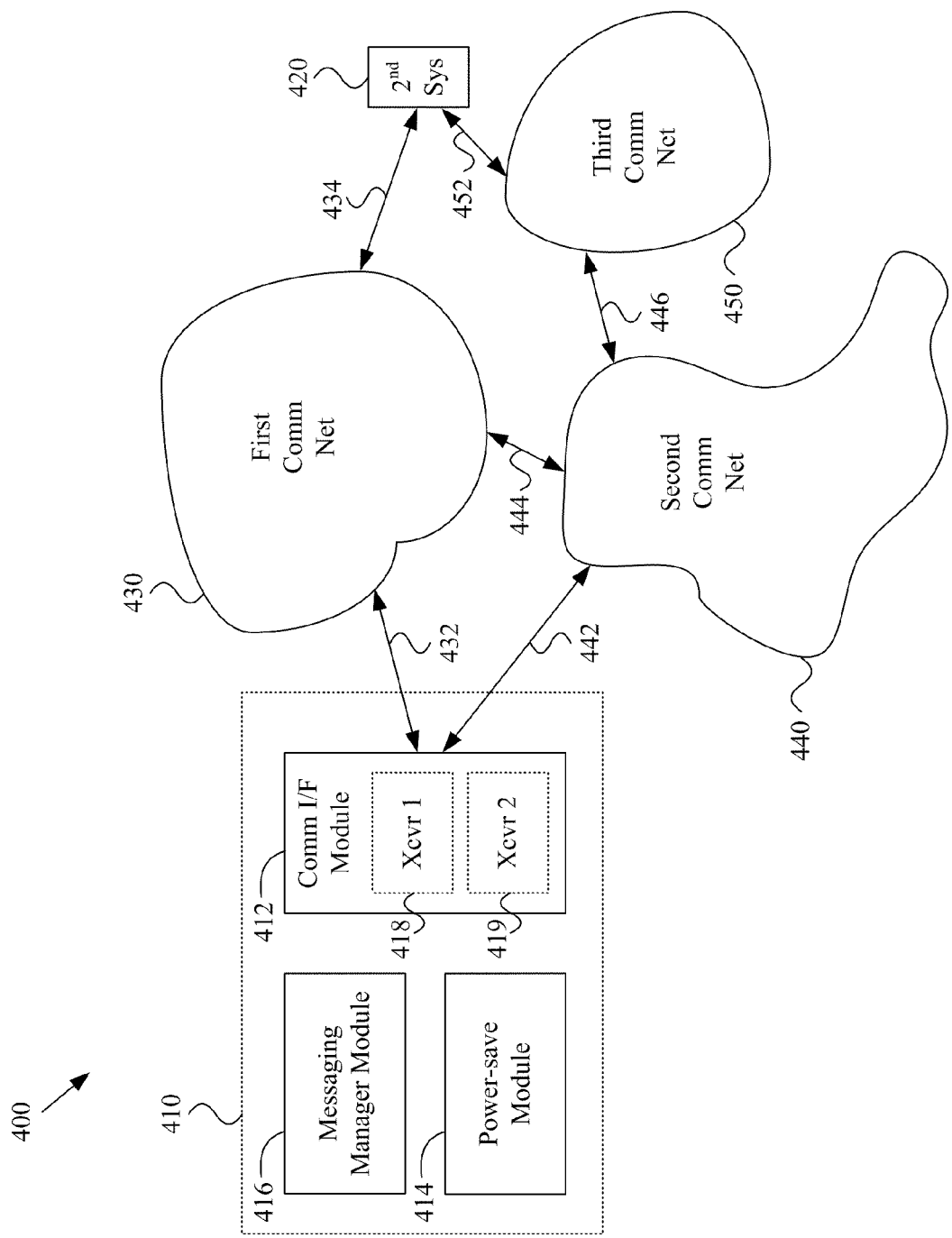
FIG. 4 is a drawing showing a block diagram of an exemplary communication environment comprising a mobile communication system for communicating message information, in accordance with various aspects of the present invention.

FIG. 4 is a drawing showing a block diagram of an exemplary communication environment 400 comprising a mobile communication system 410 for communicating message information, in accordance with various aspects of the present invention. Various components of the mobile communication system 410 may, for example and without limitation, share various functional characteristics with the exemplary methods 200, 300 illustrated in FIGS. 2-3 and discussed previously.

Additionally, the exemplary communication environment 400 may share various characteristics with the exemplary communication environment 100 illustrated in FIG. 1 and discussed previously. Note that the exemplary communication environment 400 shows a relatively small set of communication systems and mobile communication system components. The relatively small set was selected for the purpose of clarity and should by no means limit the scope of various aspects of the present invention.

The exemplary communication environment 400 comprises a mobile communication system 410, which comprises a communication interface module 412, a power-save module 414 and a messaging manager module 416. The mobile communication system 410 is communicatively coupled to the second system 420 through a plurality of communication paths. The second system 420 may, for example and without limitation, comprise a message server for, the mobile communication system 410. The mobile communication system 410 may, for example, communicate (i.e., receive and/or transmit) message-related information with the second system 420.

The following discussion will refer to various functional modules of the mobile communication system 410. It should be noted that various functional modules may be implemented in hardware, software or a combination thereof. Also, various modules may be independent or may share various portions or sub-modules. For example, a first module may share various hardware and/or software components with a second module. Accordingly, the scope of various aspects of the present invention should not be limited by any particular module implementation or by arbitrary boundaries between modules.

A first exemplary communication path between the mobile communication system 410 and the second system 420 flows through communication link 432, the first communication network 430 and communication link 434. For illustrative purposes, the first communication network 430 will occasionally be referred to as the cellular telecommunication network 430. Note, however, that such an illustrative example should in no way limit the scope of various aspects of the present invention.

The second exemplary communication path between the mobile communication system 410 and the second system 420 flows through communication link 442, the second communication network 440, communication link 444, the first communication network 430 and communication link 434. For illustrative purposes, the second communication network 440 will occasionally be referred to as the personal area network ("PAN") 440. Note, however, that such an illustrative example should in no way limit the scope of various aspects of the present invention. Notice that the second communication path comprises a portion of the first communication path (e.g., at least a portion of the first communication network 430).

The third exemplary communication path between the mobile communication system 410 and the second system 420 flows through communication link 442, the second communication network 440, communication link 446, the third communication network 450 and communication link 452. For illustrative purposes, the third communication network 450 will occasionally be referred to as the Internet 450. Note, however, that such an illustrative example should in no way limit the scope of various aspects of the present invention. Notice that the third communication path comprises a portion of the second communication path (e.g., communication link 442 and at least a portion of the second communication network 440), but is completely independent of the first communication path. This serves to illustrate that various communication paths may be dependent or independent from other communication paths.

The first, second and third exemplary communication paths will be utilized to provide specific examples of various broader aspects of the present invention. As discussed previously, various communication paths may comprise any of a variety of communication path characteristics. Accordingly, the scope of various aspects of the present invention should not be limited by characteristics of any particular communication path, by characteristics of one or more communication networks that a communication path may traverse, or by any particular number of communication paths.

The mobile communication system 410 may comprise characteristics of any of a variety of mobile communication systems. For example and without limitation, the mobile communication system 410 may comprise characteristics of a cellular phone, paging device, mobile multi-media communication device, pocket computer, personal digital assistant, mobile telephone, mobile or portable computer, etc. Accordingly, the scope of various aspects of the present invention should not be limited by characteristics of a particular mobile communication system.

The power-save module 414 may generally operate the mobile communication system 410 in a power-save mode of operation. A power-save mode of operation may be viewed generally as a mode of operation for the mobile communication system 410 in which the mobile communication system 410 is operating with reduced performance and/or functionality to save electrical energy. A power-save mode of operation may, for example, comprise powering down message communicating circuitry (e.g., the communication interface module 412). In such a mode, the mobile communication system 410 might not be capable of communication messages with another system (e.g., the second system 420). The power-save module 414 may, for example, periodically transition (e.g., wake) the mobile communication system 410 from the power-save mode to allow the mobile communication system 410 to check for messages that another system (e.g., the second system 420) is waiting to deliver to the mobile communication system 410.

As mentioned previously, such a message may comprise characteristics of any of a variety of message types. For example and without limitation, a message may comprise a multi-media, video or audio message. A message may, for example, comprise a textual, graphical or pictorial message. The scope of various aspects of the present invention should not be limited by characteristics of a particular type of message.

The power-save module 414 may, for example, transition the mobile communication system 410 from the power-save mode for various durations of time. For example, the power-save module 414 may transition the mobile communication system 410 from the power-save mode just long enough to determine whether there are pending messages to be delivered to the mobile communication system 410 and then return the mobile communication system 410 to the power-save mode. Also for example, the power-save module 414 may transition the mobile communication system 410 from the power-save mode for a relatively longer period of time (e.g., to perform functions not directly related to the communication of pending messages). For example, the power-save module 414 may transition the mobile communication system 410 from the power-save mode to make a phone call, listen to music, compose a message, view a video, etc. Accordingly, the scope of various aspects of the present invention should not be limited by characteristics of any particular reason for the power-save module 414 transitioning the mobile communication system 410 from power-save mode or of a particular duration for which the power-save module 414 may transition the mobile communication system 410 out of power-save mode.

After the power-save module 414 transitions the mobile communication system 410 from power-save mode, the messaging manager module 416 (or "messaging manager 416") may identify the availability of one or more communication paths over which information related to pending messages may be communicated. The messaging manager 416 may, for example, utilize the communication interface module 412 to perform such identification. In a non-limiting exemplary scenario, a plurality of communication paths (e.g., the three exemplary communication paths discussed previously) may be available to communicate message information between the mobile communication system 410 and the second system 420. In another non-limiting exemplary scenario, a plurality of communication paths may be available to communicate message information between the mobile communication system 410 and a plurality of other systems. Such a plurality of other systems may, for example, be independent or related (e.g., mirrored).

The messaging manager 416 may determine the availability of (or identify) one or more communication paths in any of a variety of manners. For example and without limitation, the messaging manager 416 may (e.g., utilizing the communication interface module 412) listen for and receive one or more beacon signals transmitted from respective access points of the one or more communication paths. In a non-limiting exemplary scenario, where a communication path comprises the cellular telecommunication network 430, the messaging manager 416 may utilize the communication interface module 412 (e.g., the first transceiver 418) to monitor the air medium for a beacon signal associated with the cellular telecommunication network 430. In another non-limiting exemplary scenario, where a communication path comprises the PAN 440 (e.g., based on the IEEE 802.11 communication standard), the messaging manager 416 may utilize the communication interface module 412 (e.g., the second transceiver 419) to monitor the air medium for an 802.11 beacon signal, which an access point of the PAN 440 may transmit periodically (e.g., every 100 ms).

The messaging manager 416 may also, for example, utilize the communication interface module 412 to transmit a beacon signal that may be received by an access point of a communication path (or communication network thereof). Such access point, or another communicatively coupled system, may respond to the beacon with a response message. The messaging manager 416 may then (e.g., through the communication interface module 412) receive such a response message, which may be indicative of the availability of the access point and associated communication network or path.

The messaging manager 416 may also, for example, utilize the communication interface module 412 to listen for non-beacon network traffic to determine the availability of a communication network or path. The messaging manager 416 may further, for example, utilize the communication interface module 412 to communicate information with a network status database to ascertain the availability of a network or set of networks. In general, the messaging manager 416 may identify the availability of one or more communication paths in any of a variety of manners. Accordingly, the scope of various aspects of the present invention should not be limited by characteristics of a particular manner of identifying the availability of one or more communication paths or associated components.

The messaging manager 416 may, for example, determine which of a plurality of available communication paths to utilize to attempt communication (e.g., with the second system 420). The messaging manager 416 may determine which of a plurality of communication paths to utilize in any of a variety of manners, examples of which will be discussed below.

For example and without limitation, the messaging manager 416 may sequence through an ordered list of communication paths (or associated networks) to determine (or select) a communication path. For example, the mobile communication system 410 may include (e.g., stored in a memory device) or have access to a prioritized list of communication paths to utilize. The communication paths (and associated systems) at the top of the list may be preferred to the communication paths at the bottom of the list. Referring to the exemplary communication paths discussed previously, in a non-limiting exemplary scenario, the third exemplary communication path may be preferred to the second exemplary communication path, which may be preferred to the first exemplary communication path.

In a scenario where the messaging manager 416 utilizes an ordered list of communication paths to determine a communication path, such an ordered list may be formed in any of a variety of manners. For example, such an ordered list may be directly controlled by user input. Alternatively for example, such an ordered list may be formed by the mobile communication system 410 (e.g., the messaging manager 416) based on any of a number of criteria. For example, the messaging manager 416 may determine such a list based, at least in part, on energy consumption (e.g., with the most energy-efficient communication paths at the top of the list). Also for example, the messaging manager 416 may determine such an ordered list based, at least in part, on communication quality (e.g., data rate, noise, error rate, reliability, etc.). Further for example, the messaging manager 416 may determine such an ordered list based, at least in part, on monetary cost. In general, the mobile communication system 410 (e.g., the messaging manager 416) may determine such an ordered list in any of a variety of manners. Accordingly, the scope of various aspects of the present invention should not be limited by characteristics of any particular manner of determining such an ordered list or associated components.

The messaging manager 416 may also, for example, determine (or select) the communication path in real-time, based on any of a variety of conditions. For example and without limitation, the messaging manager 416 may determine a communication path based on current energy conditions (e.g., energy available or energy required), current communication environment, current communication cost, current communication demands, etc. In an exemplary scenario, the messaging manager 416 may determine that while a first communication path may be currently preferable for communication quality reasons, current energy requirements (e.g., current energy supply or demand) mandate that a second communication path be chosen. In another exemplary scenario, the messaging manager 416 may determine that while a first communication path may be currently preferable for energy demand reasons, minimum acceptable quality dictates that a second communication path be chosen.

In a non-limiting exemplary scenario, the messaging manager 416 may determine that, because of transmission energy requirements, communicating with the second system 420 through the second and third exemplary communication paths (e.g., through the PAN 440) is preferable to communicating with the second system 420 through the first exemplary communication path (e.g., through the cellular telecommunication network 430). In another non-limiting exemplary scenario, the messaging manager 416 may determine, because of a prioritized list, to communicate with the second system 420 preferably through the third exemplary communication path (e.g., through the PAN 440 and the Internet 450), next preferably through second exemplary communication path (e.g., through the PAN 440 and the cellular telecommunication network 430), and lastly through the first exemplary communication path (e.g., straight through the cellular telecommunication network 430).

As discussed previously, the messaging manager 416 may identify available communication paths and may select which communication path to utilize. Such identification and selection may, for example, be performed sequentially or iteratively. For example and without limitation, the messaging manager 416 may determine a preferred communication path and then determine the availability of the preferred communication path. If the preferred communication path is not available, then the messaging manager 416 may determine a next preferred communication path and then determine the availability of the next preferred communication path, and so on. Alternatively, for example, the messaging manager 416 may identify all available communication paths and then select a preferred communication path from the identified available communication paths. The scope of various aspects of the present invention should not be limited by any particular sequence of operations.

In general, the messaging manager 416 may determine which of a plurality of available communication paths to utilize to attempt communication (e.g., with the second system 420). Accordingly, the scope of various aspects of the present invention should not be limited by characteristics of any particular manner of making such determination or corresponding apparatus.

The messaging manager 416 may, for example, utilize the communication interface module 412 to communicate message information with another system (e.g., the second system 420) over a selected communication path. Such message information may, for example, comprise one or more messages, information related to the availability of one or more messages, information related to the communication of one or more messages, etc. For example and without limitation, the messaging manager 416 may utilize the communication interface module 412 to communicate with the second system 420 over the selected communication path and retrieve messages from (or deliver messages to) the second system 420 over the determined (or selected) communication path.

The messaging manager 416 and/or the communication interface module 412 may communicate such message information over the determined communication path in any of a variety of manners. The messaging manager 416 and/or the communication interface module 412 may, for example, utilize any of a variety of communication protocols, encoding types, compression schemes or encryption techniques. Further for example, the messaging manager 416 and/or the communication interface module 412 may utilize any of a variety of secure access mechanisms. Accordingly, the scope of various aspects of the present invention should not be limited by characteristics of a particular manner of communicating message information over a communication path or corresponding apparatus.

The messaging manager 416 may also, for example, perform any of a large variety of additional processing. For example and without limitation, the messaging manager 416 may direct the power-save module 414 to return the mobile communication system 410 to the power-save mode. Also for example, the messaging manager 416 may repeat communication path selection and message communication with another system (e.g., different than the second system 420). Further for example, the messaging manager 416 may hand-off control of the mobile communication system 410 to other modules that operate the mobile communication system 410 in a standard mode of operation. Accordingly, the scope of various aspects of the present invention should not be limited by characteristics of any particular additional processing activities or corresponding apparatus.

As a further exemplary illustration, as the power-save module 414 transitions the mobile communication system 410 out of a power-save mode, the messaging manager 416 may attempt to utilize a first communication path (e.g., using the communication interface module 412) to check for pending messages (e.g., by communicating with the second system 420). Note that such a communication path may, for example and without limitation, comprise any of the first, second and third exemplary communication paths discussed previously. The messaging manager 416 may, for example, select which of a plurality of communication paths (e.g., a first selected communication path) to utilize. As discussed previously, in making such a selection, the messaging manager 416 may, for example, analyze an ordered list of communication paths to utilize or may, for example, perform real-time analysis of currently available communication paths to select which communication path to utilize. The messaging manager 416 may, for example, base such a determination on various communication path characteristics (e.g., energy utilization, predetermined priority, user input, expected communication quality, current communication environmental conditions, etc.).

In attempting to communicate over the first selected communication path, the messaging manager 416 may, for example, utilize the communication interface module 412 to determine the availability of the first selected communication path. As discussed previously, determining the availability of a communication path may comprise performing any of a variety of techniques for determining communication network or path availability. For example and without limitation, the messaging manager 416 may communicate beacon signal information with an access point of a communication network of the first selected communication path. Further for example, the messaging manager 416 may communicate a test message to various nodes of the first selected communication path or to the system(s) (e.g., the second system 420) with which the messaging manager 416 desires to communicate.

The messaging manager 416 may, for example, utilize the communication interface module 412 to establish a communication link between the mobile communication system 410 and the second system 420 over the first selected communication path. As mentioned previously, the second system 420 (e.g., a message server) may, for example, comprise information related to messages awaiting delivery to the mobile communication system 410. Such information may, for example, comprise the message information or information indicating the presence or absence of pending messages. The second system 420 may also, for example, receive message information from the mobile communication system 410.

The messaging manager 416 may, after establishing a communication link between the mobile communication system 410 and the second system 420 over the first selected communication path, communicate message-related information with the second system 420. As mentioned previously, the message-related information may, for example and without limitation, comprise actual message information, information related to the presence or absence of pending messages, or information related to the location or communication of pending messages.

As mentioned previously, the selected first communication path may comprise any of the first, second and third exemplary communication paths discussed previously. For example, the messaging manager 416 may first attempt to utilize the first exemplary communication path (e.g., through communication link 432, first communication network 430 and communication link 434) to communicate with the second system 420 to check for pending messages. Alternatively for example, the messaging manager 416 may first attempt to utilize the second exemplary communication path (e.g., through communication link 442, second communication network 440, communication link 444, first communication network 430 and communication link 434). Alternatively for example, the messaging manager 416 may first attempt to utilize the third exemplary communication path (e.g., through communication link 442, second communication network 440 and communication link 444).

The messaging manager 416 may, for example, determine whether the first attempt to utilize the first selected communication path to check for pending messages was successful. For example and without limitation, the messaging manager 416 may determine whether the attempt yielded an acceptable exchange of message-related information. Note that this is not necessarily related to whether or not the messaging manager 416 determines that pending messages exist. For example, in an exemplary scenario, if the messaging manager 416 completes a successful exchange of information with the second system 420 and finds that no pending messages exist, then the messaging manager 416 may determine that the first attempt was successful.

If, for example, the messaging manager 416 determines that the first attempt to check for pending messages utilizing the first selected communication path was successful, then the messaging manager 416 may perform continued processing. If, for example, the messaging manager 416 determines that the first attempt to check for pending messages was not successful, then the messaging manager 416 may attempt to utilize (e.g., communicate over) a second selected communication path to check for pending messages. Note that the second selected communication path may comprise any of the first, second and third exemplary communication paths discussed previously (e.g., different from the first selected communication path).

The messaging manager 416 may, for example and without limitation, determine (or select) which of a plurality of communication paths (e.g., a second selected communication path) to utilize. As discussed previously, the messaging manager 416 may make such a selection by analyzing an ordered list of communication paths to utilize or may, for example, perform real-time analysis of currently available communication paths to select which communication path to utilize. The messaging manager 416 may, for example, base such selection on various communication path characteristics (e.g., energy utilization, predetermined priority, user input, expected communication quality, current communication environmental conditions, etc.).

In a non-limiting exemplary scenario, the messaging manager 416 may have determined that the third exemplary communication path was preferable to the second exemplary communication path to utilize to check for pending messages. For example, the messaging manager 416 may have determined that the third exemplary communication path was preferable because the third exemplary communication path was at or near the top of an ordered list of communication paths. Also for example, the messaging manager 416 may have determined that the third exemplary communication path was preferable because of relatively high energy efficiency or communication quality. Similarly, in the non-limiting exemplary scenario, the messaging manager 416 may determine that the second exemplary communication path is preferable to other communication paths (e.g., the first exemplary communication path) for similar reasons.

In attempting to communicate over the second selected communication path, the messaging manager 416 may, for example, determine the availability of the second selected communication path. As discussed previously, the messaging manager 416 may make such a determination by performing any of a variety of techniques for determining communication network or path availability. For example and without limitation, the messaging manager 416 may utilize the communication interface module 412 to communicate beacon signal information with an access point of a communication network of the second selected communication path. Further for example, the messaging manager 416 may communicate a test message to various nodes of the second selected communication path or to the system(s) (e.g., the second system 420) with which the messaging manager 416 desires to communicate.

The messaging manager 416 may, for example, utilize the communication interface module 412 to establish a communication link between the mobile communication system 410 and the second system 420 (or another system) over the second selected communication path. As discussed previously, the second system 420 (or another system), which may comprise a message server, may comprise information related to messages awaiting delivery to the mobile communication system 410. Such information may, for example, comprise the message information or information indicating the presence or absence of pending messages. The second system 420 (or another system) may also, for example, receive message information from the mobile communication system 410.

The messaging manager 416 may, after establishing a communication link between the mobile communication system 410 and the second system 420 (or another system) over the second selected communication path, utilize the communication interface module 412 to communicate message-related information with the second system 420. The messaging manager 416 may, for example and without limitation, share various functional characteristics with step 330 or step 250 of the exemplary methods 200, 300 illustrated in FIGS. 2-3 and discussed previously. As mentioned previously, the message-related information may, for example and without limitation, comprise actual message information, information related to the presence or absence of pending messages, or information related to the location or communication of pending messages.

In a non-limiting exemplary scenario, the messaging manager 416 may first attempt to utilize the second exemplary communication path to communicate with the second system 420 and check for pending messages. Continuing the non-limiting exemplary scenario, the messaging manager 416 may determine that the first attempt failed and then attempt to utilize the first exemplary communication path to communicate with the second system 420 and check for pending messages.

In another non-limiting exemplary scenario, the messaging manager 416 may first attempt to utilize the third exemplary communication path to communicate with the second system 420 and check for pending messages. Continuing the non-limiting exemplary scenario, the messaging manager 416 may determine that the first attempt failed and then attempt to utilize the second exemplary communication path to communicate with the second system 420 and check for pending messages. Continuing the non-limiting exemplary scenario, the messaging manager 416 may determine that the second attempt also failed and then attempt to utilize the first exemplary communication path to communicate with the second system 420 and check for pending messages.

In still another non-limiting exemplary scenario, the messaging manager 416 may first attempt to utilize the second exemplary communication path to communicate with the second system 420 and check for pending messages. Continuing the non-limiting exemplary scenario, the messaging manager 416 may determine that the first attempt was successful (e.g., yielded a successful exchange of message-related information) and perform further processing, instead of attempting to communicate with the second system 420 through another communication path. Such further processing was generally discussed previously and may, for example and without limitation, comprise exchanging message information with the second system 420, operating in a standard mode of operation, or returning to a power-save mode of operation.

The exemplary communication environment 400 and mobile communication system 410 illustrated in FIG. 4 and discussed above were presented to provide specific examples of generally broader aspects of the present invention. Accordingly, the scope of various aspects of the present invention should not be limited by specific characteristics of the exemplary illustration.

In summary, various aspects of the present invention provide a system and method for managing messaging in a mobile (or portable) communication system (e.g., having power-save capability) in a multiple network environment. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a mobile communication device, a method for determining the existence of one or more pending messages, the method comprising:
   in the mobile communication device, performing actions comprising:
      exiting from a power-save mode of operation, in which the mobile communication device does not receive messages; and
      after exiting from the power-save mode of operation:
         attempting to communicate over a first communication path to check for pending messages, wherein the first communication path comprises a set of one or more independent communication networks; and
         if attempting to communicate over the first communication path to check for pending messages fails, then attempting to communicate over a second communication path to check for pending messages, wherein the second communication path comprises a set of one or more independent communication networks, at least a portion of the second set different from the first set.

2. The method of claim 1, wherein:
   said attempting to communicate over a first communication path to check for pending messages comprises attempting to communicate with a message server over the first communication path; and
   said attempting to communicate over a second communication path to check for pending messages comprises attempting to communicate with the message server over the second communication path.

3. The method of claim 1, wherein said attempting to communicate over a first communication path to check for pending messages comprises determining the availability of the first communication path by at least one of:
   receiving a beacon signal transmitted from an access point of the first communication path; and
   transmitting a beacon signal that is to be received by an access point of the first communication path.

4. The method of claim 1, comprising determining to attempt to communicate over the first communication path to check for pending messages prior to attempting to communicate over the second communication path to check for pending messages.

5. The method of claim 4, wherein said determining to attempt to communicate over the first communication path to check for pending messages prior to attempting to communicate over the second communication path to check for pending messages comprises determining that communicating over the first communication path consumes less electrical energy than communicating over the second communication path.

6. The method of claim 4, wherein said determining to attempt to communicate over the first communication path to check for pending messages prior to attempting to communicate over the second communication path to check for pending messages comprises determining that communicating over the first communication path is higher priority than communicating over the second communication path.

7. The method of claim 1, wherein the second communication path comprises at least a portion of the first communication path.

8. The method of claim 1, wherein the first communication path comprises a telecommunication network, and the second communication path comprises a computer network.

9. The method of claim 1, wherein the first communication path comprises at least one of: a personal area network and a local area network.

10. A mobile communication device operable in a power-save mode, the mobile communication device comprising:
- a communication interface module that is capable of communicating over a first communication path and over a second communication path, where the first communication path comprises a set of one or more independent communication networks, the second communication path comprises a set of one or more independent communication networks, and at least a portion of the second set is different from the first set; and
- at least one module that operates to, after the mobile communication system exits the power-save mode:
  - attempt to communicate over the first communication path to check for pending messages; and
  - if the attempt to communicate over the first communication path to check for pending messages fails, then attempt to communicate over a second communication path to check for pending messages.

11. The mobile communication device of claim 10, wherein the at least one module operates to:
- attempt to communicate over the first communication path to check for pending messages by, at least in part, attempting to communicate with a message server over the first communication path; and
- attempt to communicate over the second communication path to check for pending messages by, at least in part, attempting to communicate with the message server over the second communication path.

12. The mobile communication device of claim 10, wherein the at least one module operates to attempt to communicate over the first communication path to check for pending messages by, at least in part, determining the availability of the first communication path by at least one of:
- receiving a beacon signal transmitted from an access point of the first communication path; and
- transmitting a beacon signal that is to be received by an access point of the first communication path.

13. The mobile communication device of claim 10, wherein the at least one module operates to determine to attempt to communicate over the first communication path to check for pending messages prior to attempting to communicate over the second communication path to check for pending messages.

14. The mobile communication device of claim 13, wherein the at least one module operates to determine to attempt to communicate over the first communication path to check for pending messages prior to attempting to communicate over the second communication path to check for pending messages by, at least in part, determining that communicating over the first communication path consumes less electrical energy than communicating over the second communication path.

15. The mobile communication device of claim 13, wherein the at least one module operates to determine to attempt to communicate over the first communication path to check for pending messages prior to attempting to communicate over the second communication path to check for pending messages by, at least in part, determining that communicating over the first communication path is higher priority than communicating over the second communication path.

16. The mobile communication device of claim 10, wherein the second communication path comprises at least a portion of the first communication path.

17. The mobile communication device of claim 10, wherein the first communication path comprises a telecommunication network, and the second communication path comprises a computer network.

18. The mobile communication device of claim 10, wherein the first communication path comprises at least one of: a personal area network ("PAN") and a local area ("LAN") network.

* * * * *